United States Patent [19] [11] 3,728,485
Osborne et al. [45] Apr. 17, 1973

[54] TIME-MULTIPLEXED TIME REFERENCE DISSEMINATION SYSTEM

[75] Inventors: Eugene F. Osborne, Westminster; Lauren J. Rueger, Silver Spring; Otis E. Gooding, Laurel, all of Md.

[73] Assignee: The United States of America as represented by the Secretary of the Navy

[22] Filed: July 9, 1971

[21] Appl. No.: 161,032

[52] U.S. Cl...................178/69.5 R, 325/58, 325/60, 325/153
[51] Int. Cl...................H04b 1/04
[58] Field of Search..................178/69.5 R; 179/15 BS; 325/60; 331/60

[56] References Cited

UNITED STATES PATENTS 3,117,280 1/1964 Palmer..................178/69.5 R

*Primary Examiner*—Robert L. Griffin
*Assistant Examiner*—George G. Stellar
*Attorney*—R. S. Sciascia et al.

[57] ABSTRACT

Signals produced by the Navy Navigation Satellite System enable a receiver of these signals to determine the precise time by decoding a certain portion of the transmitted signal. This portion is known as the beep word and represents a phase modulation pattern synchronized to Naval Observatory time. A method and apparatus is proposed to provide timing accuracy to within one-tenth of a microsecond by the addition of two modulation frequencies in the satellite's beep word that are coherent in time and frequency with the bit rate modulation on the RF carrier.

Since each Navy (Doppler) Navigation Satellite is radio "visible" to every position on earth at least twice each day, and moves frequently at high latitudes, a truly global system is proposed for the dissemination and recovery of high accuracy timing references that are related to a single Primary Standard of Time. The principal radio signals are transmitted one-way from satellite to ground.

6 Claims, 4 Drawing Figures

INVENTORS
EUGENE F. OSBORNE
LAUREN J. RUEGER
OTIS E. GOODING

BY J A Cooke
ATTORNEY

EUGENE F. OSBORNE
LAUREN J. RUEGER
OTIS E. GOODING
INVENTORS

TIME-MULTIPLEXED TIME REFERENCE DISSEMINATION SYSTEM

BACKGROUND OF THE INVENTION

The concept of synchronization and/or calibration of remotely dispersed clock and timing systems by means of radio transmissions from satellites is not new. Several experiments and demonstrations have been performed but, as yet, there is no operational service available which has high inherent accuracy or simplicity in system concept and users equipment.

The transmission of timing references by radio requires modulation having (1) unique epochs that constitute a definite transition from state "A" to state "B," (2) rise times for the transitions that are sufficiently short to permit high resolution and accuracy, (3) a waveform structure that permits identification, without ambiguity of the fiducial transition, (4) a frequent repetition rate of the fiducial epochs for the user's convenience and for smoothing statistical errors, (5) high accuracy inherent within the signal in terms of calibration, normalization, and stability relative to atomic time, universal time or other acceptable reference, and (6) efficient utilization of the radio channel spectrum. In relation to requirements four and six, it should be noted that, from the point of information flow, the number of transitions (or timing data bits) is exceedingly small, i.e., on the order of one every 15 seconds. The accuracy to which the transition must be determined is, however, very stringent, therefore a compromise design uses excess information content and signal bandwidth so as to relax the instrumentation required for the user's detection process.

In the general sense there are many waveforms and modulation techniques that would be adequate for high accuracy timing. The major concepts utilized in satellite systems involve either analog modulation concepts or digital modulation concepts. The principal types of systems involving analog modulation concepts are continuous wave multiple tone systems, single tone phase reversal systems, pulsed modulation systems and television systems. However, analog waveforms and amplitude modes of modulation are discarded as serious candidates for the Navy Navigation System on the grounds of circuit complexity, satellite power limitations, and general incompatibility with the primary functions of this satellite system.

The transmission of information by digital signaling requires a finite set of discrete modulating symbols. Complex digital signaling can be constructed with various coded sequences of binary or M-ary waveforms. Modulation of the radio wave itself is accomplished by two or more keying states such as:

1. On-Off Keying (OOK) which is a form of amplitude modulation,

2. Frequency Shift Keying (FSK) where a unique frequency represents a digital state, and 3. Phase Shift Keying (PSK) where each unique phase state relative to the unmodulated carrier signal represents a digital character or symbol. Generally, PSK infers binary operation with 0° and 180° representing the digital states. In M-ary PSK the full 360° phase space is divided into M equal parts, the phase center of each part representing a digital symbol.

In the flow of information over a radio channel, the great advantage of digital signaling is that the accuracy of reception is not dependent upon fidelity of waveform recovery in the receiving terminal but is, rather, dependent only on the probability of correct decisions as to digital state, character, or symbols vs time. Digital encoded signaling is, without doubt, the primary modulation candidate for modern communications and telemetry via orbiting satellite subsystems.

In the present design the Navy Navigation Satellites contain an on-board electronic clock of modest quality, and transmitters that continuously radiate phase modulated carrier signals at 150 MHz and 400 MHz. Each satellite transmits under clock control information that is formatted for each sequential 2 minute period thereby enabling any receiver of said signal to determine position and timing information. The modulation is a continuous stream of binary bit words with the first three words providing synchronization and timing information and the remaining words providing navigation information and other messages. The first 3 bit words, referred to collectively as marker words, are comprised of a Barker word, a synchronizing word, and a beep word, respectively. It is the beep word that is used by most remote receivers to obtain the correct time as synchronized with Naval Observatory standard time references. In the information transmitted coherence and uniformity in time scale are not presently preserved within each 2 minute message frame as certain of the 6103 modulation bit intervals are of longer duration than others.

SUMMARY OF THE INVENTION

The time-multiplexed method and apparatus as proposed by the present invention improves satellite signals transmitted as well as the ability of a remote user to recover timing references from the said satellite signals for the calibration of his local clock or for the purpose of the measurement of slant range to the satellite. Overall system accuracies are improved by at least two orders of magnitude relative to the Navigation System Standard which is synchronized to Naval Observatory time. The improved accuracy is made possible by the time-multiplexed satellite transmission of PSK digitally encoded modulation, the components of which are all coherently generated and integrally related. The composite modulation is more uniformly precise and it contains higher information rates in order to achieve increased time resolution in the noisy environment of the user's ground receiver. In the example of the invention described, the new modulation is confined to the beep time doublet of the presently formatted 2 minute message wave immediately following its fiducial epoch. In general, new modulation of higher information rate may be inserted at any nondedicated position in the message if more frequent availability is needed. The present beep doublet would be replaced by a complex waveform generated by logic encoding of digitally symbolic characters (or waveform components).

The information content of the improved waveforms must provide increments in information rate spanning from the basic 6103 bits per 120 seconds rate of the standard satellite message to the maximum information rate required for improved timing accuracy. Intermediate information rates are required to resolve all possible ambiguities in recovery and identification of the timing or ranging epoch. In the example of the invention described herein, a minimum of two additional information rates are needed to meet the stated objectives. These two information rates are referred to herein as a first and second frequency where the frequency stated is the primary component of the Fourier series describing the square wave or pulse.

It is therefore an object of the present invention to provide a compatible satellite navigation and timing system that provides service to users on a world-wide basis which is accurate to within one-tenth of a microsecond or better in timing error between a user's local clock and the satellite system's Primary Time Standard.

Another object of the instant invention is to provide a time reference satellite system that is accurate enough for control and collision avoidance between high velocity aircraft including both the military as well as domestic and international carriers.

Another object of the subject invention is to provide a timing method for the generation and transmission from satellites of time references having world-wide reception and utilization at ground stations.

Still another object of the present invention is to provide a highly stable and accurate time reference system.

Still another object of the subject invention is to provide a method of time-multiplexing of timing information with navigation messages to produce a compatible navigation time reference signal that can be utilized as an accepted universal standard.

Still another object of the invention is to provide a method of digital data encoding in which the several information rates of the composite modulation format supply a capability for the unambiguous identification and recovery of fiducial epochs with progressively greater accuracy as the higher information rates are used.

Still another object of the subject invention is to provide by digital encoding of highly precise and accurate epochs within the modulation of the satellite signals a means by which a user having a local clock or an alternative method of establishing a local time scale can measure directly the time interval expended in the radio wave propagation from the orbiting satellite to said user from which the slant range (in units of length) to the satellite can be determined with great accuracy (10 to 100 feet) and precision at specific instants of time.

Other objects and many of the attendant advantages of this invention will be readily appreciated as the same becomes better understood by reference to the following detailed description when considered in connection with the accompanying drawings.

DESCRIPTION OF THE PREFERRED EMBODIMENT

Figures 1A, 1B, 1C:
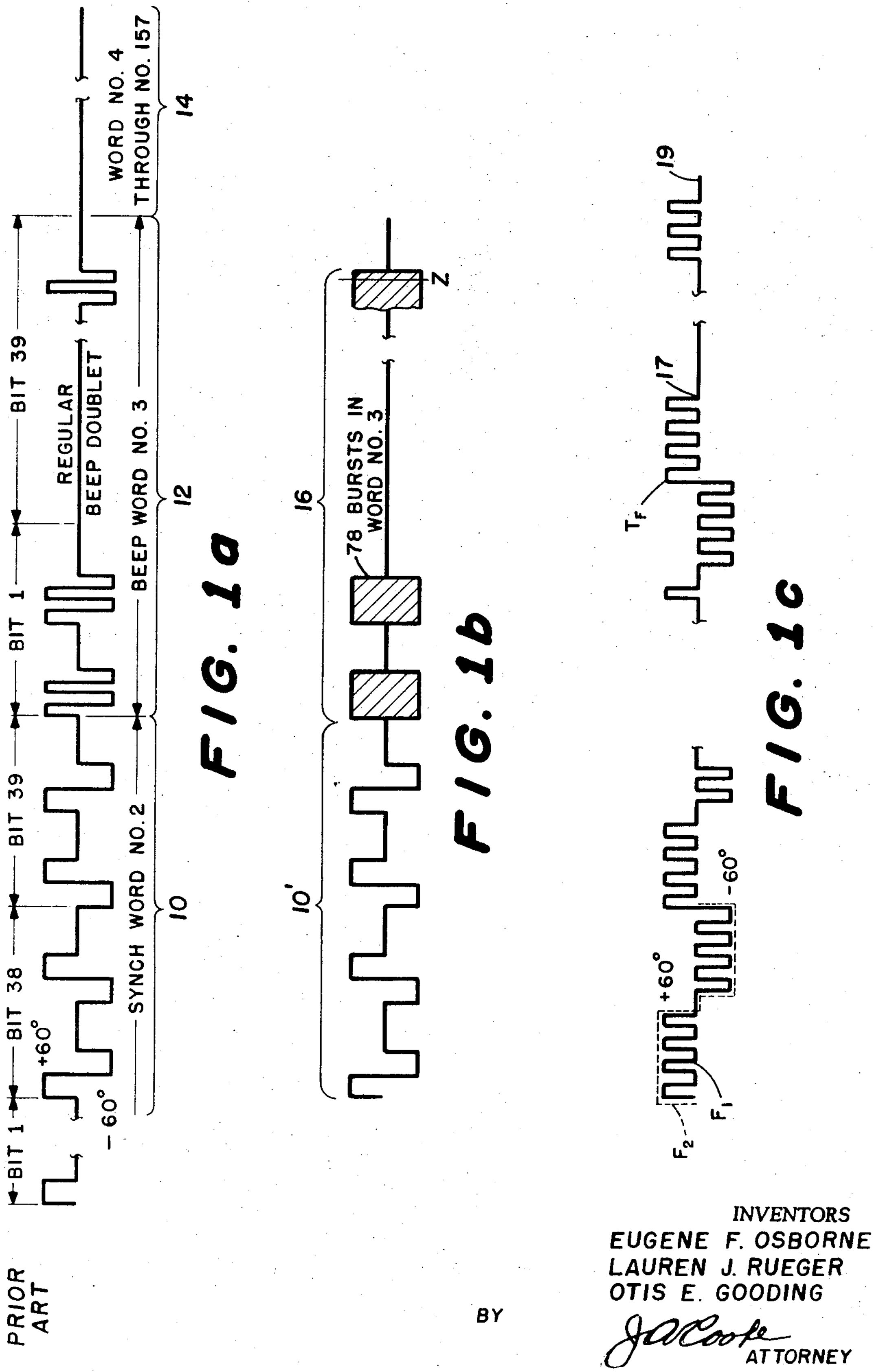
FIG. 1a, FIG. 1b, FIG. 1c PRIOR ART
FIGS. 1*a* through 1*c* are waveforms illustrating the time reference words and the time reference modulation scheme as taught by the present invention.

Referring now with greater specificity to FIGS. 1*a* through 1*c*, there is shown the prior art waveform in FIG. 1*a* and the waveform as produced by the subject invention in FIGS. 1*b* and 1*c*. As was previously discussed use of the present invention is particularly adapted for operation with the Navy Navigation Satellite System which allows ground receivers of the transmitted phase modulation pattern to accurately determine time and location. The beginning of each transmitted signal is comprised of a Barker word (not shown), a synchronous word 10, and a beep word 12. The beep word, which provides the user with time of day information as referenced to Naval Observatory Time, is composed of 39 binary beep doublets. Following the beep word 12 is the message portion which comprises word four through word 157 (not shown). At the end of the transmission of the message portion 14, the Barker, synchronous and beep words are repeated and another message begins. Referring now to FIG. 1*b*, the present invention replaces the 400 Hz beep doublet by a complex wave 16 generated by logic encoding of digital wave trains. One very simple digital wave shown in FIG. 1*b* uses a first and second frequency, e.g., by logic combining of 26 KHz and 3.25 KHz square waves. The 26 KHz information rate is used to obtain the required time accuracy. The 3.25 KHz information rate is required for ambiguity resolution in conjunction with the total 2 minute message format. In the basic concept the 3.25 and 26 KHz components are generated coherently with respect to each other and also to the carrier at least for the time interval of Word 3 and are transmitted by the satellite at power levels normal for ± 60° phase modulation. During Word 3, as shown in FIG. 1*c*, there are 78 information bursts uniformly distributed at 4 times the standard bit rate, each burst consisting of 16 and 128 cycles of 3.25 and 26 KHz respectively. There are therefore a total of 1,248 and 9,984 positive going excursions during word 3 of the initial 3.25 and 26 KHz components. Shown at reference numeral 17 is the end of the first timing burst in Word 3 and at reference numeral 19 is the end of the 78th burst which is also the end of Word 3. Other waveforms of a random as well as periodic structure are also possible and contemplated.

Fiducial time is defined in the waveform structure of FIG. 1*c* as that "specific epoch" comprising the last positive going phase "zero crossing" at $T_f$.

Figure 2:
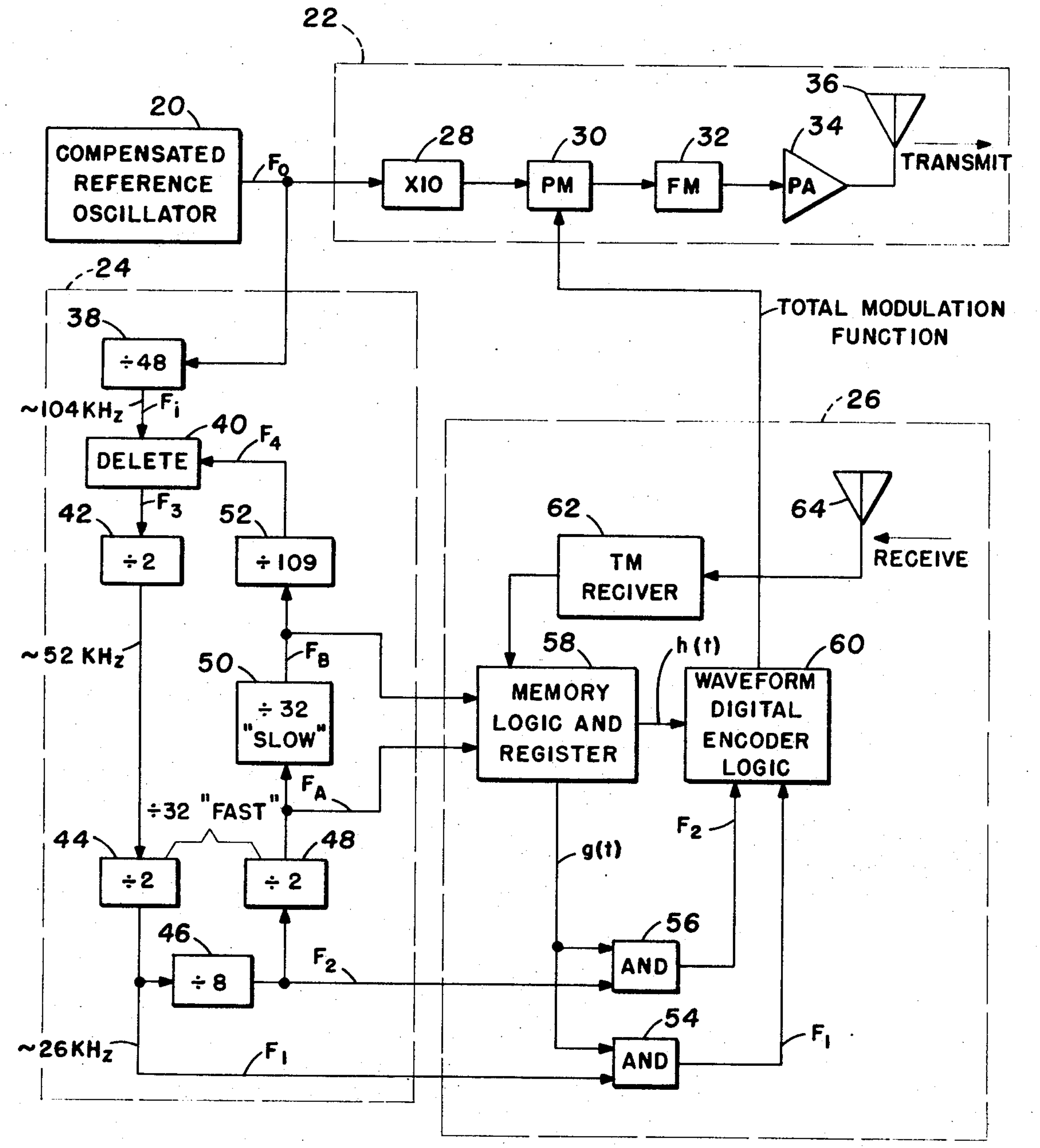
FIG. 2 is a block diagram illustrating a coherent carrier-modulation system employing the time-multiplexing method of the present invention.

Referring now to FIG. 2, there is shown the time-multiplexed method, as previously described in FIGS. 1*a* through 1*c*, implemented in a totally coherent satellite system. Basically, the coherent transmission system of FIG. 2 comprises:

a reference oscillator 20, a phase modulation-transmission subsystem 22, a modulation frequency subsystem 24, and a waveform combining subsystem 26. Comprising the phase modulation-transmission subsystem 22 is a frequency multiplier 28, a phase modulator 30, a frequency multiplier 32, a power amplifier 34 and a transmission assembly 36. Comprising the modulation frequency subsystem 24 is a divide-by-48 frequency divider 38 having an output designated as $F_t$, a delete circuit 40 receiving $F_t$ as a first input signal and receiving another input signal designated as $F_4$, said delete circuit 40 having an output signal designated as $F_3$, a pair of divide-byatwo frequency dividers 42 and 44, said frequency divider 44 having an output signal designated as $F_1$, a divide-by-eight frequency divider 46, said frequency divider 46 having an output signal designated as $F_2$, a divide-by-two frequency divider 48, a divide-by-32 frequency divider 50, and a divide-by-109 frequency divider 52 having an output signal previously designated as $F_4$. Comprising the waveform combining subsystem 26 is a pair of AND gates 54 and 56, a memory logic and register circuit 58, a waveform combiner logic circuit 60, a telemetry receiver 62 and a receiving antenna 64. For purposes of explanation only, the output frequency, $F_o$, of the reference oscillator 20 will be 5 MHz (nominal) and the frequency of the output signals $F_1$, $F_2$, $F_3$, and $F_B$ will be according to the following predetermined relationships:

1. $F_1 = 512\ F_B = 26.03946$ KHz
2. $F_2 = 64 F_B = 3.25493$ KHz
3. $F_3 = 2{,}048\ F_B = 104{,}157.87$ Hz

It is to be understood that the use of specific frequencies in the apparatus as shown in FIG. 2 and as listed above is not intended in any way to limit the scope or breadth of the subject invention and is presented for illustration purposes only.

The output of the reference oscillator 20 is applied in parallel to multiplying circuit 28 (nominally a multiplication factor of 10) and also to divide-by-48 frequency divider circuit 38. For Doppler Navigation System purposes the desired output $F_o$ of the compensated reference oscillator is 4,999,599.9936 Hz or $5\ (1 - 80.0013 \times 10^{-6})\ 10^6$ Hz. In other words, it is desired that the output frequency be lacking in 80 parts per million from the output frequency of 5 MHz. The output signal $F_i$ of divider circuit 38 is applied to the delete circuit 40 which also receives input signal $F_4$. In a totally coherent system there is no direct correction from the memory logic and register of the bit interval to adjust timing. A fixed, predetermined adjusting rate is provided by the delete circuit to guarantee the correct bit frequency with the frequency of the reference oscillator set to the specified system frequency. Accordingly, the delete circuit 40 deletes the necessary parts per million from the 5 MHz nominal frequency $F_i$ provided by the reference oscillator 20 to provide an output signal $F_B$ representing exactly 6,103 (doublet) bits in 120 seconds. $F_B$ is applied to frequency dividing circuit 52 which counts 109 of segments of $F_B$ and then commands via $F_4$ the delete circuit to delete 1 bit from incoming $F_i$. Other variations of the modulation frequency subsystem 24 are possible. For example, if the compensated oscillator 20 output $F_o$ is controlled to $5(1-84.48+ \times 10^{-6})10^6$ $H_3$, then the delete circuit 40 and the divide by 109 circuit 52 could both be omitted.

As previously mentioned $F_1$ and $F_2$ have frequencies of 26 KHz and 3.25 KHz respectively. These frequencies represent an example of improved modulation for providing accurate beep time words. The transmission of these new modulation rates cannot randomly occur due to the fact that the beep word has a predetermined timing format as related to the entire satellite transmission. Therefore the memory logic and register circuit 58 emits a signal $g(t)$ to AND gates 54 and 56 whereby $F_1$ and $F_2$ are allowed to pass through said AND gates to subsequently be combined in the waveform combiner logic circuit 60 for subsequent application to the phase modulator 30, in the time slot allocated to Word No. 3 which is the "beep" word. The application of $g(t)$ to AND gates 54 and 56 is regulated by $F_A$, $F_B$ and delayed commands received through the telemetry receiver 62 and stored in the memory register (58). In proper sequence another control signal $h(t)$ is applied to the waveform combiner logic circuit 60 enabling said waveform circuit to combine all other message words according to the format shown in FIG. 1*c*. The envelope of the waveform of FIG. 1*c* is $F_1$ at 3.26 Kc while the fine structure within $F_1$ is $F_2$ at 26 KHz. The envelope of $F_1$ is set out slightly from the bit characters for illustration purposes only. As previously mentioned, the specific frequencies are merely design expedients. It is necessary, however, that the ratio of $F_2$ to $F_1$ be numerically exact and a simple integer as, for example, one-to-eight. The output of the waveform combiner logic circuit is applied to the phase modulator 30 to produce a phase modulated carrier having phase deviation of ±60° or 0° as shown in FIG. 1*c*. Emergent from phase modulator 30, the phase modulated carrier is applied to frequency multiplier 32 and to power amplifier 34 prior to transmission through transmitter 36 to the ground user.

Obviously many modifications and variations of the present invention are possible in light of the above teachings. It is therefore to be understood that within the scope of the appended claims, the invention may be practiced otherwise than specifically described.

We claim:

1. In combination with an artificial earth satellite having a communications system, wherein said communication system continuously transmits messages in the form of a recurrent pattern of modulation with associated Fourier components on a carrier frequency, said recurrent modulation pattern being composed of a continuous stream of binary bit words with the first portion of said stream providing synchronization and timing information and the remaining portion of said stream providing navigation and other information, a time-multiplexed time reference dissemination system for improving the accuracy of said timing information, comprising, means for generating a basic reference frequency, means for producing from said basic reference frequency, first and second signals having, respectively, first and second frequencies which are primary components of the Fourier series which describe said recurring modulation pattern, said first and second signals being coherently generated and integrally related, and means for applying said first and second signals to said recurring modulation pattern during said timing information portion.

2. The combination specified in claim 1, and further including, frequency adjusting means connected to said basic reference frequency generation means and rendered effective by said second signal periodically to produce from said basic reference frequency an adjusted frequency signal representing a predetermined precise message bit rate.

3. The combination specified in claim 2 wherein said frequency adjusting means comprises, a plurality of frequency dividers for dividing said second signal into a predetermined time adjusting rate, and delete circuit means operably connected intermediate said basic reference frequency generation means and said plurality of frequency dividers for deleting portions of the output of said basic reference frequency generation means according to said predetermined adjusting rate.

4. The combination specified in claim 1 wherein said means for applying said first and second signal to said recurring modulation patterns during said timing information portion comprises, memory logic circuit means receiving said recurrent modulation function, said memory logic circuit means emitting a signal, $[g(t)]$, whenever said timing information portion of said recurring modulation function occurs, first "and" gating means receiving said first signal and said $[g(t)]$ signal, said first gating means passing said first signal whenever said $[g(t)]$ signal is present, second "and" gating means receiving said second signal and said $[g(t)]$ signal, said second gating means passing said second signal whenever said $[g(t)]$ signal is present, and means for combining said first and second signals.

5. The combination specified in claim 1 wherein said means for producing said first and second signals comprises means responsive to said first signal for producing said second signal from said first signal.

6. The combination specified in claim 5 wherein said means for producing said second signal from said first signal includes a frequency divider means operably connected to receive said first signal for dividing said first signal by an integral amount to produce said second signal.

* * * * *